UNITED STATES PATENT OFFICE.

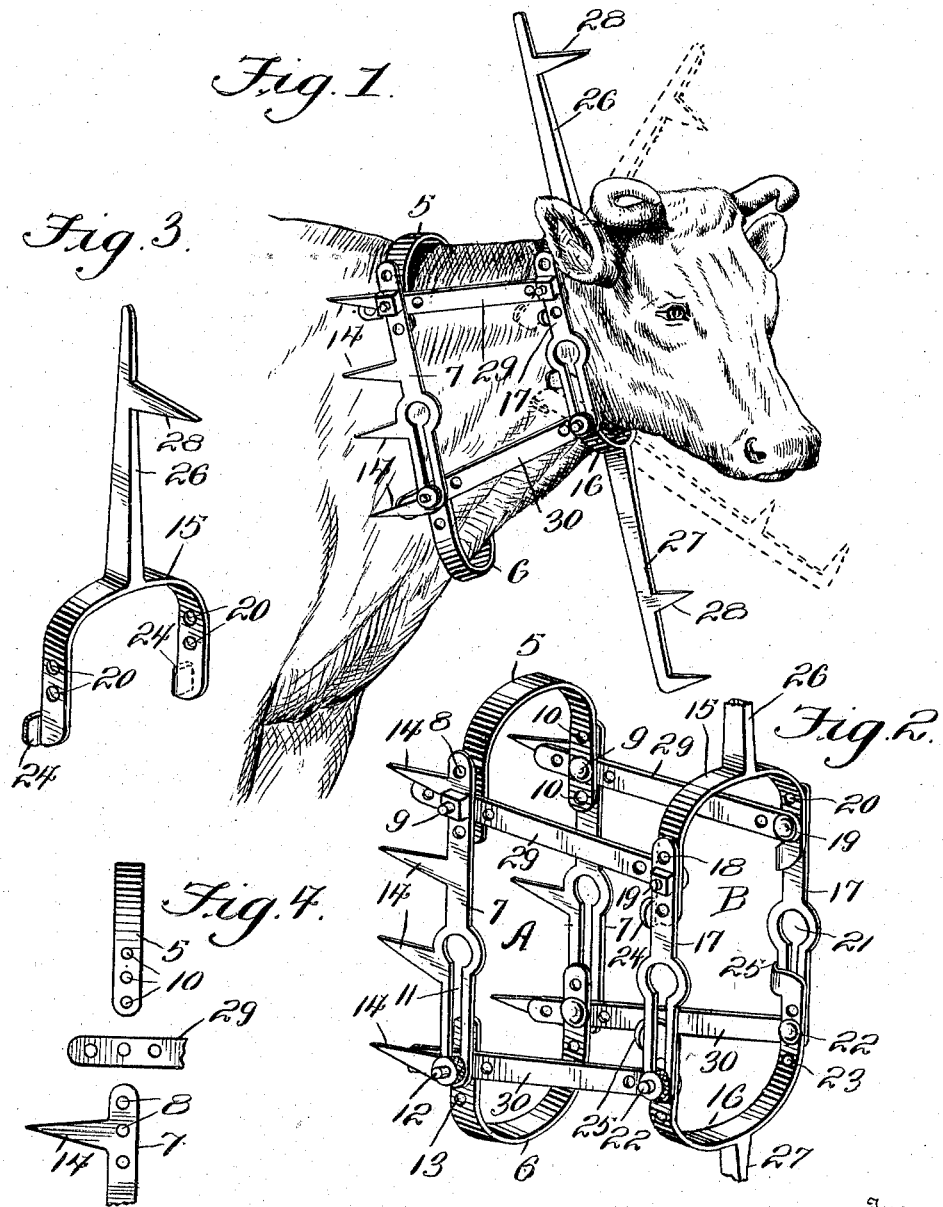

CHRISTOPHER C. BABB, OF DALLAS, GEORGIA.

ANIMAL-POKE.

966,881.  Specification of Letters Patent.  Patented Aug. 9, 1910.

Application filed December 1, 1909. Serial No. 530,863.

*To all whom it may concern:*

Be it known that I, CHRISTOPHER C. BABB, a citizen of the United States of America, residing at Dallas, in the county of Paulding and State of Georgia, have invented new and useful Improvements in Animal-Pokes, of which the following is a specification.

This invention relates to animal pokes or yokes having for their object to prevent the animal wearing the device from jumping or breaking through fences without materially interfering with the comfort of the animal in other respects.

One object of the present invention is to provide a device of this class of simple and efficient construction which may be conveniently modified as to size so as to be fitted upon animals of different stature.

A further object of the invention is to provide a device of the character described having upwardly and downwardly extending obstructing bars which, however, shall be capable of moving so as not to prevent the animal from grazing or feeding.

Still further objects of the invention are to simplify and improve the general construction and operation of a device of the character outlined above.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the invention may be resorted to when desired.

In the drawing,—Figure 1 is a perspective view showing the invention as applied to the neck of an animal. Fig. 2 is a perspective view, showing the device detached. Fig. 3 is a perspective view, showing the upstanding obstructing member detached. Fig. 4 is a detail view in side elevation, showing certain parts of the device separated or detached from each other.

Corresponding parts in the several figures are denoted by like characters of reference.

The improved device is composed of collar members which may be conveniently described as the rear collar member A and the front collar member B.

The rear collar member is composed of the upper and lower arched end members 5 and 6 which are terminally connected and spaced apart by means of side bars 7, each of which is provided adjacent to one end with a plurality of apertures 8 for the passage of connecting bolts 9, whereby they are connected with the end member 5 which is likewise provided with a plurality of apertures 10 for the passage of the connecting bolts. The side members are provided adjacent to their lower ends with keyhole slots 11 for the passage of the heads of connecting bolts 12, whereby said side members are terminally connected with the end member 6 which is provided with apertures 13 for the passage of the connecting bolt. It will be seen that by this construction a neck-engaging collar, the dimensions of which may be very conveniently varied by proper adjustment of the connecting bolts, is provided. The side members 7 are provided with rearwardly extending barbs or prongs 14.

Referring now to the front collar B, the said collar is composed of arched upper and lower end members 15 and 16 which are connected and spaced apart by side members 17 provided adjacent to their upper ends with apertures 18 for the passage of bolts 19, whereby they are adjustably connected with the member 15 which is likewise provided adjacent to each end with a plurality of apertures 20. The side members 17 are provided adjacent to their lower ends with keyhole slots 21 for the passage of the heads of connecting bolts 22, whereby they are connected with the lower end members 16 which is likewise provided adjacent to each end with a plurality of apertures 23, whereby adjustment of the parts is made possible. It will be observed that the side members 17 are pivotally connected with the end members 15 and 16 by the connecting bolts 19 and 22; and said end members 15 and 16 are provided adjacent to their ends with laterally extending lugs 24 and 25 which by bearing against the rear edges of the side members 17 will serve to limit the swinging movement of the members 15 and 16 in a forward direction. Said members 15 and 16 are provided with bars 26 and 27 extending respectively upwardly and downwardly therefrom, said bars being equipped with prongs or barbs 28 extending forwardly therefrom. The front and rear collars A and B are adjustably connected and spaced apart by means of link members or connecting rods 29 and 30, the former of which are mounted upon the bolts 9 and 19, while the latter connecting members are mounted upon the bolts 20 and 22, each of said links or connecting members being provided with a plurality of apertures for the passage of the respective bolts in order that adjustment between the collar members A and B may be effected, whereby they may be suitably spaced apart.

From the foregoing description, taken in connection with the drawing hereto annexed, the operation and advantages of this invention will be readily understood. It will be seen that the collar members A and B may be fitted upon the necks of animals of various sizes, the collar member A being placed adjacent to the shoulders, while the member B is fitted just in rear of the head, this relative arrangement being maintained by the means of the spacing and connecting links 29 and 30. Normally the obstructing bars 26 and 27 will project upwardly and downwardly from the neck of the animal. Should the latter attempt to break through a fence the passage will be obstructed by the bars 26 and 27 which extend from the pivoted end members 15 and 16, the latter being swung rearwardly until obstructed by the lugs 24 and 25 encountering the rear edges of the side members 17; the entire device will then be pushed or forced rearwardly upon the neck of the animal, causing the barbs 14 to prick the shoulders, thereby inducing the animal to retreat. The ordinary comforts of the animal will not be interfered with by the present device. The device is simple and thoroughly efficient for the purpose for which it is provided.

Having thus described the invention, what is claimed as new, is:—

1. In a device of the character described, a pair of collar members each comprising arched end members and side members adjustably connecting the same, the side members of one collar member being provided with rearwardly extending barbs and the arched end members of the other collar member being provided with upwardly and downwardly extending obstructing members, and links adjustably connecting and spacing the said collar members.

2. In a device of the character described, a rear collar member having rearwardly extending barbs, a front collar member having side members and arched end members pivotally connected with said side members, said arched end members being provided with upwardly and downwardly extending obstructing members, and links adjustably connecting and spacing the collar members.

3. In a device of the character described, a rear collar member having rearwardly extending barbs, a front collar member comprising side members and arched end members pivotally connected therewith and provided with laterally extending terminal lugs engaging the rear edges of the side members, said arched end members being also provided with upwardly and downwardly extending obstructing members, and links adjustably connecting and spacing the front and rear collar members.

4. In a device of the character described, a rear collar member comprising arched end members and barbed side members adjustably connecting and spacing said end members, a front collar member comprising arched end members having upwardly and downwardly extending obstructing members and laterally extending terminal lugs, and side members adjustably connecting and spacing the said arched end members, and links adjustably connecting and spacing the front and rear collar members.

In testimony whereof I affix my signature in presence of two witnesses.

CHRISTOPHER C. BABB.

Witnesses:
J. L. PARKER,
B. F. WHEELER.